June 18, 1929.  J. H. POWRIE  1,717,405
APPARATUS FOR PRINTING POSITIVE PICTURES IN NATURAL COLORS
Original Filed March 16, 1920   2 Sheets-Sheet 1
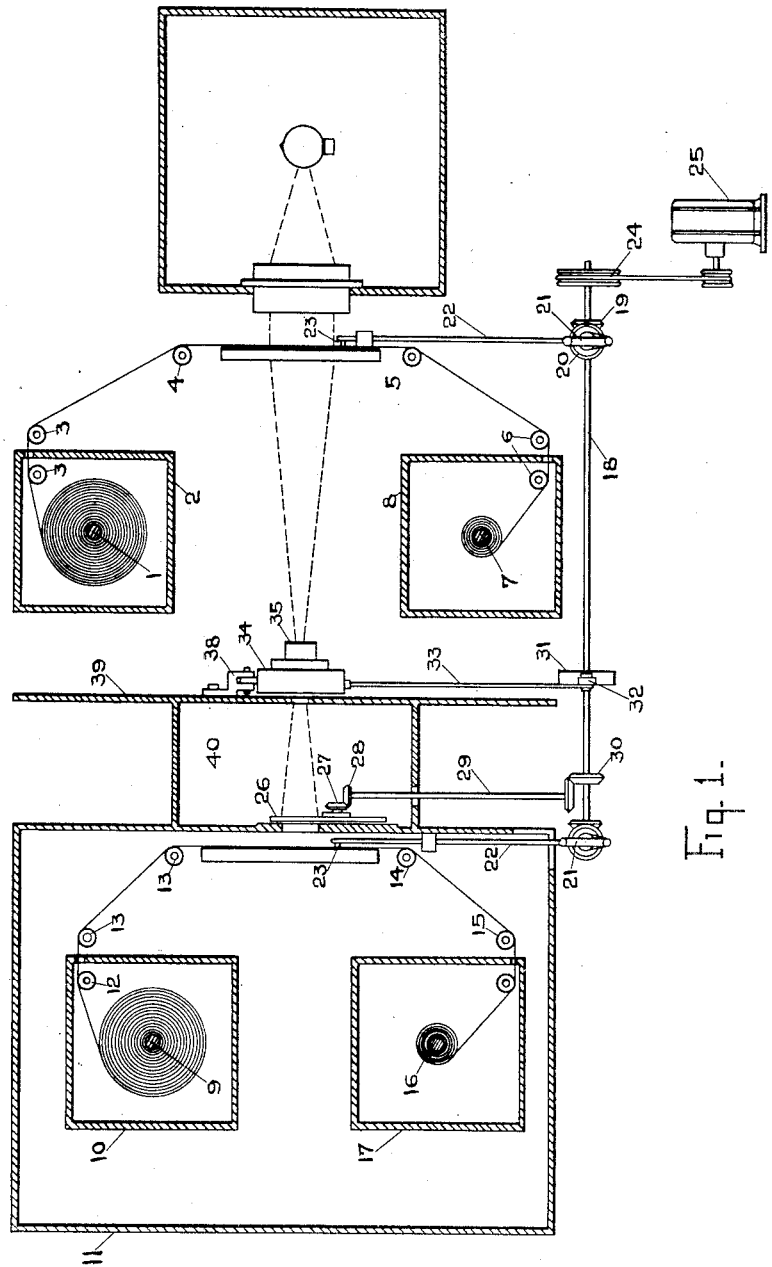

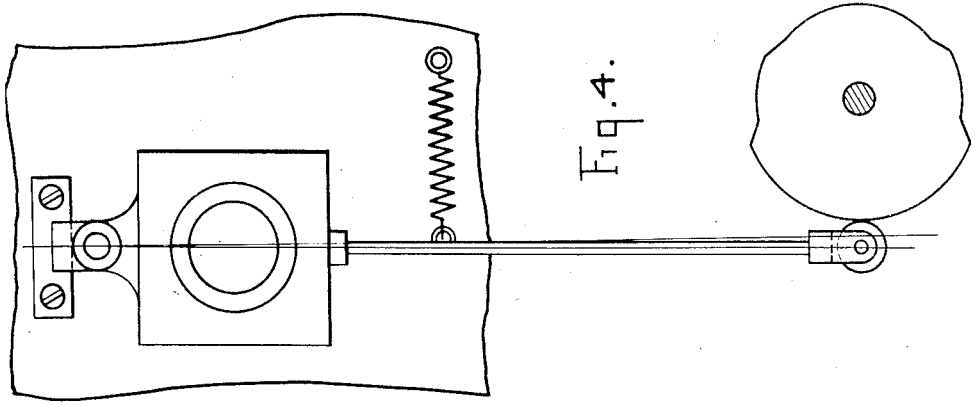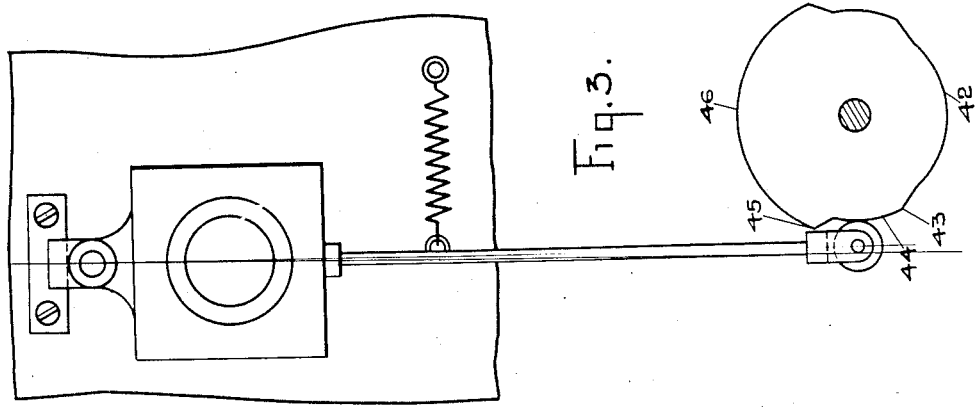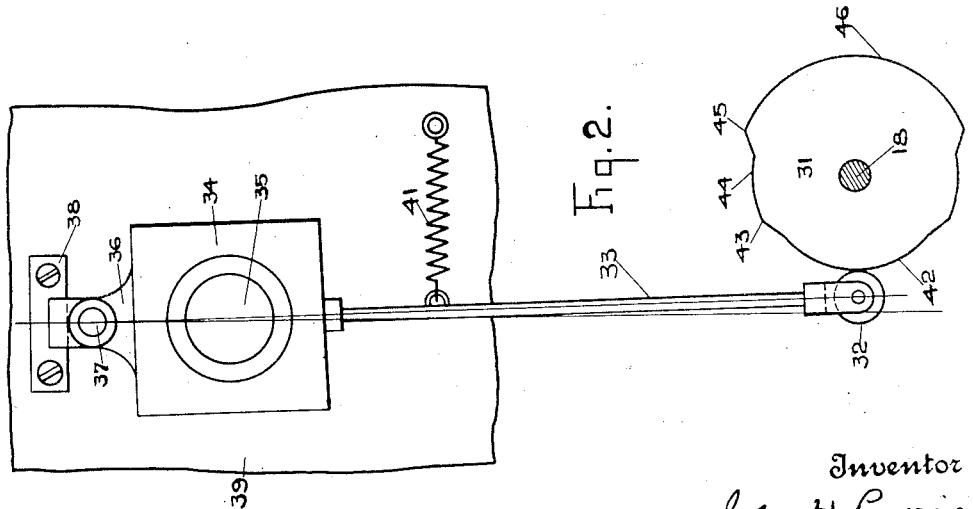

Patented June 18, 1929.

1,717,405

UNITED STATES PATENT OFFICE.

JOHN H. POWRIE, OF NEW YORK, N. Y.

APPARATUS FOR PRINTING POSITIVE PICTURES IN NATURAL COLORS.

Original application filed March 16, 1920, Serial No. 366,198. Divided and this application filed October 30, 1926. Serial No. 145,125.

This invention relates to certain improvements in apparatus for the production of positive images or pictures in natural colors on color screen films of comparatively long length from negative color screen films.

The subject matter of the present application is a division of my prior Patent No. 1,605,062, dated November 2, 1926, which describes and claims broadly the production of a sensitive color screen film having a regular recurring pattern of colored elements suitable for use either for taking negatives or for producing positives from such negatives.

Briefly, the invention of my application referred to above consists in producing on a flexible support of desired length a colored screen of suitable recurring elements, such as parallel lines colored in different colors, as red, blue or green, the colored elements being produced on one side of the film, coated with a protective coating, and a sensitized emulsion placed on the film over the colored elements.

In the printing of positives on a colored screen of this character from a negative printed on a similar screen, it is desirable that the printing be effected so that the screen pattern will be sufficiently fine as to be optically eliminated during projection at ordinary viewing distance, and so that in the printing of the positive image from the negative the so-called moiré is eliminated and the positive will have sufficient luminosity for effective projection.

It is the especial object of the present invention to provide an improved apparatus for effecting the printing of a positive picture on a screen film from a negative screen film of similar character, that is, in which the color screen patterns are the same.

With this and other objects not specifically referred to in view, the invention consists in certain novel parts, arrangements and combinations which will be described in connection with the accompanying drawings and the novel features pointed out in the claims hereunto annexed.

In these drawings,—

Figure 1 is a sectional side elevation of an apparatus for effecting the printing, and Figures 2, 3 and 4 are diagrammatic, partly sectional, face views of certain parts of the operating mechanism showing these parts in different positions.

Referring now to these drawings, an apparatus is illustrated for printing a positive picture on a sensitized support of considerable length, as a film from a negative on a colored screen, and it may be assumed that the screen elements of negative and positive films are a regular recurring pattern of parallel lines running in the direction of the length of the film, these lines being in the three primary colors, red, blue, and green.

In accordance with the invention, the apparatus will include means for eliminating the so-called moiré effect and for accurately printing the positive image so that this image will appear clearly when projected by transmitted light. Furthermore, the printing is so effected that the lines of the negative film are optically eliminated. While this may be effected in various ways, this may be done by effecting a shifting or movement of the negative image during the printing operation, and this is conveniently done by effecting a movement of the printing lens. Where, as in the present instance, a negative film is employed in which the linear structure consists of regular recurring periods, each of three lines, the lens is shifted twice, that is, the width of two of the lines, each movement of the lens being, of course, the width of a line.

In the particular construction illustrated, there is shown a negative screen film N wound on a spindle 1 suitably supported in a magazine 2. From this magazine 2, the negative film is carried over guide rolls 3, 4 to and past a printing light over guide rolls 5, 6 to a take-up spindle 7 suitably supported in a magazine 8, and driven in any suitable way. The positive film on which the picture is to be printed is a screen film of parallel lines and suitably sensitized. This film is supported on a spindle 9 suitably supported in a light tight magazine 10 which is secured in a housing 11 and is drawn from the magazine 10 over guide rolls 12, 13 past the printing light, and over guide rolls 14, 15 to a driven take-up spindle 16 in a magazine 17, also suitably supported in the housing 11. The negative film is drawn past the printing light by the usual intermittent feeding mechanism, which briefly includes a power shaft 18 provided with a gear 19 meshing with a gear 20, which in turn drives a crank arm 21 which carries a bar 22 having a claw 23 which engages the feeding notches in the edges of the film, as is well known.

The shaft 18 extends across the apparatus, and at its other end is provided with a similar film feeding device for feeding the positive film synchronously with the negative film. The shaft 18 may be driven in any suitable manner, as by a belt and pulley 24 driven from a motor 25.

A shutter 26 operates synchronously with the feeding mechanism of the positive film to expose the film at the proper intervals while the two films are at rest, this shutter 26 being driven in any suitable way, as by gears 27, 28 from a short vertical shaft 29 driven from a gear 30 on the power shaft 18, before referred to, from which shaft, as before described, the positive film feeding mechanism is also operated.

While the lens movement may be effected in various ways, in the particular construction illustrated, it is effected from a cam 31 on the power shaft 18, before referred to. This cam is shown in full lines in Figs. 2, 3 and 4 and, as there shown, the cam co-operates with a cam roll 32 carried on a rod 33. Mounted on this rod is a housing 34 in which is mounted the lens, indicated at 35. This housing carries a projection 36 which is pivoted at 37 in a bracket 38 suitably supported to a faceplate 39 of the dark chamber 40 of the printing mechanism. This cam is laid out, therefore, so as to shift the position of the lens relatively to the positive film during the printing operation and while the shutter is open, the lens being returned to normal position during the period that the shutter is closed, that is, the periods between the exposures on the positive film. The cam is laid out to effect this, as shown, in which, assuming the normal position is that shown in Fig. 2, the cam roll is held in engagement by a spring 41 with the face of the cam 42. During the first sixth revolution of this cam, no movement of the cam roll is effected. The cam is provided with an abrupt high point 43 which shifts the roll to the left, that is, to the position shown in Fig. 3, and the roll is held in this position by a face 44 during the second sixth revolution of the cam. At the end of this face 44 is a second abrupt point 45 which shifts the roll further to the left, that is, to the position shown in Fig. 4, the roll after shifting being held against a face 46 of the cam which holds it in the position of Fig. 4. During the third sixth revolution of the cam, the image is thus shifted the width of two lines during the printing, it being understood that during the second half of the revolution of the cam the shutter is closed and the roll is returned to the normal position of Fig. 2.

This shifting movement of the lens and consequently the image results in the optical elimination of the lines, as is more fully described in my prior Patent No. 1,605,062, to which reference may be had.

While the apparatus shown and described is a convenient one for effecting the printing operation, it will be understood that this can be carried out in other ways. The invention is, therefore, not to be restricted to the details of construction shown and described, but that these may be varied as desired within the scope of the appended claims.

What I claim is:

1. In an apparatus for printing a positive picture on a sensitized color screen support from a color screen negative, the combination of a light source, means for passing the negative and the positive sensitized support past the light source, and means for effecting a relative step movement of the projected image and the positive support during the printing operation, each step corresponding to one of the colors of the projected image.

2. In an apparatus for printing a positive picture on a sensitized color screen support from a color screen negative having a pattern of parallel lines, the combination of a light source, means for passing the negative and the positive sensitized support past the light source, a lens, and means for effecting a relative step movement of the lens and the positive support during the printing operation, each step corresponding to one of the colors of the projected image.

3. In an apparatus for printing a positive picture on a sensitized color screen support from a color screen negative having a pattern of parallel lines, the combination of a light source, means for passing the negative and the positive sensitized support past the light source, a lens, and means for effecting a step movement of the lens relatively to the positive support during the printing operation, each step corresponding to one of the colors of the projected image.

4. In an apparatus for printing a positive picture on a sensitized color screen support from a color screen negative having a pattern of parallel lines, the combination of a light source, means for synchronously moving the negative and the positive sensitized support past the light source, a lens, and means for effecting a relative step movement of the lens and the positive support during the printing operation, each step corresponding to one of the colors of the projected image.

5. In an apparatus for printing a positive picture on a sensitized color screen support having a regular recurring pattern of colored elements from a color screen negative, the combination of a light source, means for feeding the negative and the positive sensitized support intermittently past the light source to effect the printing of a picture, and means for effecting a relative step movement of the projected image and the positive support during the printing operation, each step corresponding to the widthwise dimension of one colored element of the negative screen image.

6. In an apparatus for printing a positive picture on a sensitized color screen support having a regular recurring pattern of colored elements from a color screen negative, the combination of a light source, means for feeding the negative and the positive sensitized support intermittently past the light source to effect the printing of a picture, and means for effecting a progressive relative step movement of the projected image and the positive support during the printing operation, each step corresponding to the widthwise dimension of one colored element of the negative screen image.

7. In an apparatus for printing a positive picture on a sensitized color screen support having a regular recurring pattern of colored elements from a color screen negative, the combination of a light source, means for feeding the negative and the positive sensitized support intermittently past the light source to effect the printing of a picture, a lens, and means for effecting a relative step movement of the lens and the positive support during the printing operation, each step corresponding to the widthwise dimension of one colored element of the negative screen image.

8. In an apparatus for printing a positive picture on a sensitized color screen support having a regular recurring pattern of colored elements from a color screen negative, the combination of a light source, means for feeding the negative and the positive sensitized support intermittently past the light source to effect the printing of a picture, a lens, and means for effecting a step movement of the lens and the positive support during the printing operation, each step corresponding to the widthwise dimension of one colored element of the negative screen image.

9. In an apparatus for printing a positive picture on a sensitized color screen support having a regular recurring pattern of colored elements from a color screen negative, the combination of a light source, means for feeding the negative and the positive sensitized support intermittently past the light source to effect the printing of a picture, a lens, and means for effecting a progressive step movement of the lens and the positive support during the printing operation, each step corresponding to the widthwise dimension of one colored element of the negative screen image.

10. In an apparatus for printing a positive picture on a continuous sensitized color screen film from a color screen film negative having a pattern of parallel lines, the combination of a light source, means for supporting a roll of negative film, means for supporting a roll of positive film, means for feeding the negative and positive films past the light source, and means for effecting a relative step movement of the image and the positive film during the printing operation, each step corresponding to one of the colored lines of the projected image.

11. In an apparatus for printing a positive picture on a continuous sensitized color screen film from a color screen film negative having a pattern of parallel lines, the combination of a light source, means for supporting a roll of negative film, means for supporting a roll of positive film, means for feeding the negative and positive films past the light source, a lens, and means for effecting a relative step movement of the lens and the positive film during the printing operation, each step corresponding to one of the colored lines of the projected image.

12. In an apparatus for printing a positive picture on a continuous sensitized color screen film from a color screen film negative having a pattern of parallel lines, the combination of a light source, means for supporting a roll of negative film, means for supporting a roll of positive film, means for feeding the negative and positive films past the light source, a lens, and means for effecting a step movement of the lens relatively to the positive film during the printing operation, each step corresponding to one of the colored lines of the projected image.

13. In an apparatus for printing a positive picture on a continuous sensitized color screen film from a color screen film negative having a pattern of parallel lines, the combination of a light source, means for supporting a roll of negative film, means for supporting a roll of positive film, means for feeding the negative and positive films past the light source, a lens, and means for effecting a progressive step movement of the lens relatively to the positive film during the printing operation, each step corresponding to one of the colored lines of the projected image.

14. In an apparatus for printing a positive picture on a continuous sensitized color screen film having a pattern of parallel lines from a color screen film negative having a pattern of parallel lines, the combination of a light source, means for supporting a roll of negative film, means for supporting a roll of positive film, a lens interposed between the films and the light source, means for feeding the negative and positive films past the light source, and means for effecting a step movement of the lens relatively to the positive film during the printing operation, each step corresponding to one of the colored lines of the projected image.

15. In an apparatus for printing a positive picture on a continuous sensitized color screen film from a color screen film negative, the combination of a light source, means for supporting a roll of negative film, means for supporting a roll of positive film, a lens interposed between the films and the light source, means for feeding the negative and positive films past the light source, and a cam shaped to effect a step movement of the lens relatively to the positive film during the printing operation, each step corresponding to one of the colors of the projected image.

16. In an apparatus for printing a positive picture on a continuous sensitized color screen film from a color screen film negative, the combination of a light source, means for supporting a roll of negative film, means for supporting a roll of positive film, a lens interposed between the films and the light source, means for feeding the negative and positive films past the light source, and a cam shaped to effect a progressive step movement of the lens relatively to the positive film during the printing operation, each step corresponding to one of the colors of the projected image.

17. In an apparatus for printing a positive picture on a continuous sensitized color screen film from a color screen film negative, the combination of a light source, means for supporting a roll of negative film, means for supporting a roll of positive film, a lens interposed between the films and the light source, means for feeding the negative and positive films past the light source, and a cam shaped to effect a progressive sidewise step movement of the lens relatively to the positive film during the printing operation, each step corresponding to one of the colors of the projected image.

18. In an apparatus for printing a positive picture on a continuous sensitized color screen support from a color screen negative, the combination of a light source, means for feeding the negative and positive support past the light source, a lens, and a cam shaped to effect a progressive step movement of the lens relatively to the positive film during the printing operation, each step corresponding to one of the colors of the projected image.

In testimony whereof, I have hereunto set my hand.

JOHN H. POWRIE.